United States Patent [19]

Knapp

[11] 4,000,781
[45] Jan. 4, 1977

[54] WELL TREATING PROCESS FOR CONSOLIDATING PARTICLES WITH AQUEOUS EMULSIONS OF EPOXY RESIN COMPONENTS

[75] Inventor: Randolph H. Knapp, Houston, Tex.

[73] Assignee: Shell Oil Company, Houston, Tex.

[22] Filed: Nov. 13, 1975

[21] Appl. No.: 631,774

Related U.S. Application Data

[63] Continuation-in-part of Ser. No. 571,195, April 24, 1975, abandoned.

[52] U.S. Cl. .............................. 166/276; 166/295; 427/386
[51] Int. Cl.² ................. E21B 33/138; E21B 43/04
[58] Field of Search .......... 166/295, 294, 276, 278; 427/386, 212, 221

[56] References Cited

UNITED STATES PATENTS

| | | | |
|---|---|---|---|
| 2,880,116 | 3/1959 | Alps et al. ...................... | 427/386 X |
| 3,294,166 | 12/1966 | Havenaar et al. ................. | 166/295 |
| 3,309,224 | 3/1967 | Weber .............................. | 427/386 X |
| 3,339,633 | 9/1967 | Richardson ........................ | 166/295 |
| 3,416,604 | 12/1968 | Rensvold ............................ | 166/295 |
| 3,428,122 | 2/1969 | Methven et al. ................... | 166/295 |
| 3,621,915 | 11/1971 | Bruist et al. ....................... | 166/276 |
| 3,738,862 | 6/1973 | Klarquist et al. .................. | 427/386 |
| 3,826,310 | 7/1974 | Karnes .............................. | 166/276 |
| 3,867,986 | 2/1975 | Copeland ....................... | 166/295 X |
| 3,935,339 | 1/1976 | Cooke, Jr. ...................... | 427/386 X |

Primary Examiner—Stephen J. Novosad
Attorney, Agent, or Firm—H. W. Coryell

[57] ABSTRACT

Particles are resin-coated in a remote location, such as a subterranean reservoir or a sand or gravel pack, by contacting them with a cationic aqueous emulsion which contains a resin-forming mixture of a polyepoxide and a relatively water-soluble tertiary-amine that is capable of both catalyzing the polymerization of the polyepoxide and oil-wetting of solid surfaces.

21 Claims, No Drawings

WELL TREATING PROCESS FOR CONSOLIDATING PARTICLES WITH AQUEOUS EMULSIONS OF EPOXY RESIN COMPONENTS

CROSS-REFERENCE TO RELATED APPLICATIONS

This application is a continuation-in-part of application Ser. No. 571,195 filed Apr. 24, 1975, now abandoned.

BACKGROUND OF THE INVENTION

This invention relates to a process for consolidating and/or plugging a mass of the particles or permeable material in a location that is relatively remote and hot, such as a region in or around the borehole of a well. The invention is particularly useful for bonding particles into an integral permeable structure.

Treatments for consolidating a mass of particles in a relatively remote location, such as an unconsolidated reservoir or in a sand or gravel mass within the borehole of a well, comprise known and commonly used procedures. The present invention relates to a particularly advantageous type of such a treatment, one completed by contacting the particles with a single aqueous liquid.

Resin-forming mixtures of polyepoxides and amines of the types used in the present invention have been used or proposed for use in prior processes such as the following. The process of Havenaar and Meys Pat. No. 3,294,166 permeably consolidates a subterranean sand by first displacing water away from the region to be treated and then injecting an oilphase liquid solution of a resin-forming mixture from which the solidifying resin is precipitated. The process of the E. A. Richardson U.S. Pat. No. 3,339,633 is similar except for using a more concentrated solution of resin-forming materials and over-flushing to ensure permeability. The process of the Bruist-Hamby-Simon-Tuttle U.S. Pat. No. 3,621,915, and also that of U.S. Pat. No. 3,857,444, form permeable resin-consolidated sand or gravel packs by coating the pack grains with oil-phase liquid solutions of resin forming components in polar solvents, suspending the coated grains in liquids that are partially, but incompletely, miscible with the solutions of resin-forming material and then pumping in the suspensions. The process of the Knapp and Almquist patent application Ser. No. 514,705 filed Oct. 15, 1974, plugs (and consolidates) a permeable subterranean formation by injecting an aqueous emulsion that contains dispersed oilphase liquid solutions of both acrylic and epoxy resin-forming materials and polymerization rate controlling materials and forms a relatively solid gel throughout the volume occupied by the emulsion.

A process for manufacturing a low cost construction material was described by A. S. Micheals in Industrial & Engineering Chemistry, September 1960. In that process a resin-forming mixture of polyepoxides, amine and organic solvent was mixed with an aqueous slurry of sand grains. The so-treated sand grains were then strained free of liquid, pressed together, and cured at about 340° F, to form a construction material said to have high strength, high bonding efficiency, and good water repellency.

SUMMARY OF THE INVENTION

The invention is a process for coating the surfaces of a mass of particles with a solution of epoxy resin components which become solid while the coated particles are located within a relatively remote and hot location. A polymerizable polyepoxide and a relatively water-soluble tertiary-amine which is capable of both catalyzing the polyepoxide polymerization and the oil-wetting of solid surfaces are dissolved into an oil-phase liquid solution. The oil-phase liquid solution is dispersed in an aqueous liquid to form an oil-in-water cationic emulsion that is capable of wetting solid surfaces with an oil-phase liquid solution of resin components that subsequently form a solid resin. The surfaces of the solids being treated are wetted with the oil-phase liquid solution, while its resin-forming components are liquid, the so wetted surfaces are disposed within the relatively remote and hot location until the solid resin is formed.

In gravel packing a well, the pack particles are mixed with an aqueous emulsion of the present resin-forming oil-phase liquid solution. In one procedure, the emulsion is allowed to break so that the particles are coated with the resin-forming solution while its components are liquid. Then the coated particles are suspended in an aqueous-carrier liquid and pumped into the well, so that they are screened out against the reservoir formation and are consolidated into a permeable integral mass when the resin solidifies.

In consolidating or strengthening a mass of particles in situ within a relatively remote region such as a subterranean location, an aqueous emulsion of the resin-forming oil-phase liquid solution is injected into the mass so that it breaks and coats the surfaces of the particles in the solution of resin-forming components. The coating is allowed to remain on the particles until the mass is consolidated or strengthened by the solidification of the resin.

In plugging a permeable formation in such a location, the emulsion of the present resin-forming oil-phase liquid solution is injected into the formation while the composition and pH of the emulsion are adjusted so that it breaks relatively quickly and wets the walls of the pores of the formation with enough resin-forming solution to plug at least some of the pores. Where desired, e.g., to ensure substantially complete plugging or plugging near the face of the formation, finely divided solids, such as silica flour, comminuted asphalt, etc., can be suspended in the emulsion before it is injected.

DESCRIPTION OF THE INVENTION

The invention is, at least in part, premised on the following discovery. An oil-phase liquid solution of epoxy resin-forming components can be formulated and applied to solid surfaces so that it wets the surfaces and resin-coats them in the presence of an aqueous liquid. In order to do this, although substantially any polymerizable polyepoxide can be used, the curing agent should be a tertiary-amine which is relatively watersoluble and is capable of both catalyzing the polyepoxide polymerization and oil-wetting a solid surface. The composition and concentration of the oil-phase liquid solution components can be arranged so that the rate of polymeration is relatively low at substantially normal atmospheric temperatures (e.g., from about 40° to 110° F), but becomes high enough in a relatively hot location (e.g., at from about 80° to 350° F), to cause the resin to solidify within a few hours. Solid surfaces can be coated with the resin-forming solution by contacting them with a cationic oil-in-water emulsion of the solution with the pH of the emulsion at a value that causes the emulsion to break while it is in contact with the surface to be coated. And, such coating treatments of solid surfaces can be arranged to consolidate a mass of particles into a permeable integral structure, to strengthen such a mass or formation, or to partially or substantially completely plug the pores of a permeable material.

In the present resin-forming oil-phase liquid solutions, the amine is a tertiary-amine which is relatively water-soluble and is capable of functioning as an oil-wetting surface active agent. The polyepoxide and amine dissolve to form or become an oil-phase liquid solution in which the polyepoxide is polymerizing. The rate of the polymerization is effected by the compositon and proportion of the components and the temperature of the solution. When the oil-phase liquid solution is mixed with an aqueous liquid, the proportion of the amine that remains in the oil-phase solution (where it is available to catalyze the polymerization within the oil-phase liquid) is affected by the amount of amine that was initially present, the water-solubility of the amine, and the neutral salt content and pH of the aqueous liquid. In such a mixture, the liquids and their components become partitioned so that, among other things, some of the amine is dissolved in the aqueous liquid and some of the aqueous liquid is dissolved in the oil-phase liquid. Within the aqueous liquid an equilibrium exists between the amount of the amine that remains as such and the amount that becomes converted to substituted ammonium ions (which form when protons in the aqueous liquid combine with molecules of the amine). Decreasing the pH of the aqueous liquid increases the proportion of substituted ammonium ions and also increases the amount of the amine that can be dissolved in the aqueous liquid. And, both of these effects decrease the proportion of amine available for catalyzing the polymerization within the oil-phase liquid solution.

A resin-forming polyepoxide suitable for use in the present invention comprises substantially any polyepoxide that contains a plurality of reactive epoxy groups and polymerizes in the presence of conventional amino curing-agents for epoxy resins to form a cured (solid) epoxy resin. Examples of suitable polyepoxides are described in the book, "Epoxy Resins" by H. Lee and K. Nevill, McGraw Hill, New York, 1957, and/or in U.S. Pat. No. 2,633,458, or the like. Particularly suitable polyepoxides comprise those available from Shell Chemical Company as EPON 815 or EPON 828, or the emulsifiable non-ionic surfactant containing "epoxies" or epoxy resin-forming materials available from General Mills as Genepoxy M200, M205 or TSX-679 emulsion or the like.

Tertiary-amines suitable for use in the present invention are relatively free of pluralities of nitrogen atoms to which hydrogen atoms are attached, are capable of catalyzing the polymerizations of polyepoxides, are relatively water soluble, and are oil-wetting surface active materials. Examples of suitable curing agents include (dimethylaminomethyl phenol (available as DMP-10 from Rohm and Haas), 2,4,6-tri(dimethylaminomethyl) phenol (available as DMP-30 from Rohm & Haas), the tri-2-ethylhexoate salt of 2,4,6-tri(-dimethylaminomethyl) phenol (available as Curing Agent D from Shell Chemical Company), and the like. Other suitable organic acid salts of such tertiary amines are also useful, e.g., the benzoates, acetates, propionates, butyrates, isobutyrates, valerates, isovalerates, caproates, caprylates, caprates, laurates, myristates, and oleates. Other suitable tertiary amines include benzyldimethylamine and alpha-methylbenzyldimethylamine. The tertiary-amines can be used in the form of mixtures in which properties such as a high water-solubility but a low catalytic activity of one can be balanced by an opposite arrangement of the magnitudes of those properties in another. Pyridine and its derivatives (such as the picolines and pyridones), butyldimethylamine, and triethanolamine, etc., can be used and can increase the water-solubility of a mixture because of their relatively high water miscibility and solvent characteristics. The related triethylamine, which is only slightly water soluble, may be useful for its catalytic activity. The di-polyethoxylated aliphatic tertiary amines such as the Ethomeens (Armak Chemical Company) have less water solubility, but are known to be good hardeners or curing agents for epoxy resins.

An aqueous liquid suitable for use in the present invention can comprise substantially any relatively fresh or potable relatively soft water of aqueous liquid solution. In general, such aqueous liquids preferably contain less than about 10,000 parts per million total dissolved solids, and less than about 1,000 parts per million multivalent cations.

The aqueous emulsions of the present invention are oil-in-water emulsions in which the dispersed oil-phase components consist essentially of the polyepoxide and the tertiary-amine. The aqueous liquid polyepoxide and amino curing-agent can be mixed together in any order. However, it is generally preferable to first form an aqueous emulsion containing the polyepoxide and then combine that emulsion with the amine.

Such emulsions can advantageously contain a small amount of a water-thickening agent, such as a hydroxy-ethylcellulose ether, to improve their stability at normal atmospheric temperature. The emulsions preferably contain an emulsion stability-enhancing-amount (e.g., 1–2% by weight) of a nonionic surfactant, such as a sorbitan polyoxyethylene monolaurate available as TWEEN 20, a sorbitan monolaurate available as SPAN 20, polyoxyethlene-lauryl alcohol condensates available as BRIJ 30 and BRIJ 35, the PLURONIC polyols available from BASF Wyandotte, etc.

The emulsions of the present invention can, where desirable, contain relatively small proportions of silanes or other silicon compounds which are reactive with epoxy groups. Such silicon compounds may function as bonding agents that increase the bond strength between the resinous materials and sand grains or other particles. Examples of silicon compounds which may be suitable for use in the present invention include the hydroxy or amino group-containing silanes of the type described in the T. F. Mika U.S. Pat. No. 2,843,560. The patent describes silane-containing polyepoxy polymers which form resins having increased coating and bonding strengths. The suitable silicon compounds also include the silanes described in U.S. Pat. No. 3,150,116 relating to silane-modified epoxy resins formed from polyepoxides which contain a plurality of hydroxyl groups. Other suitable silicon compounds include the aminopropyltriethoxy silanes such as the gamma-aminopropltriethoxy silane which is available from Union Carbide under the name SILANE A-1100, and epoxide group-containing epoxyalkylsilane ester, such as beta-(3,4-epoxycyclohexyl) ethyltrimethoxysilane, which is available from Union Carbide as SILANE A-186. Preliminary tests are generally desirable to determine whether a given silane is advantageous in a given situation. Situations have been observed in which a particular silane is detrimental relative to allowing the epoxy to spread on the silica surfaces. Wetting may occur, only with very large contact angles. Also certain silanes have been observed to be incompatible with otherwise suitable water samples.

Where desired, for example to increase the ability of the emulsified component to flow into a relatively low permeability formation, such as a tight reservoir, the polyepoxy components and/or other oil-phase materials used in the present emulsions can be diluted with a polar solvent. This makes a "softer" emulsion in which the dispersed droplets of the oil-phase components are less viscous and can more readily be deformed as they are being displaced through tight openings or capillaries within the reservoir. Suitable solvents comprise substantially any liquid polar organic solvent for polyepoxides. Examples of suitable solvents include alcohols, esters, ethers, ketones, or the like, such as methylisobutyl ketone, 2-(2-ethoxy)-ethanol, ethyl acetate, methy ethyl ketone, etc. Polar solvents that are relatively miscible with both oil and water may be desirable in enhancing the miscibility between the oil-phase liquid solution of the resin-forming components and any aqueous liquid that surround solid surfaces which have been wetted by the resin-forming solution. For example, when sand grains have been wetted with the solution of resin-forming components, suspended in an aqueous carrier fluid and screened out against a reservoir formation, the presence of such a mutually water and oil soluble solvent in the solution of resin-forming components tends to keep the outermost layers of the coatings on the grains somewhat soft and miscible so that the coating components on one grain tend to mix with and become bonded to those on an adjacent grain. Particularly suitable oil and water miscible solvents include acetone, the lower alcohols, methyl ethyl ketone, methyl isobutyl ketone, etc.

The pH of an emulsion of the present invention is preferably correlated with respect to the composition and concentration of the amino curing-agent and the surface charge properties of the particles to be coated. For example, water-wet silica surfaces exhibit a negative charge where the pH of a surface-contacting aqueous liquid is above about 2.2. Because of such a surface charge effect, when a cationic emulsion is flowed into a siliceous sand, the emulsion breaks and the grains are coated with the material that constituted the dispersed phase of the emulsion. This phenomena is commonly used in applying asphalt emulsions to sands and gravels for road construction.

In the emulsions of the present invention, the amino curing-agents are oil-wetting surface active materials that cause a surface attraction between the dispersed droplets of polymerizing polyepoxide and the particles to be coated, and also cause the curing of the resins that are being formed by those polymerizing resinous materials. For a given amino curing-agent the strength of the attraction between the oil-phase droplets and the surfaces of the particles can be controlled by adjusting the pH of the emulsion system. For a given curing-agent the surface attraction increases as the pH decreases. In addition, pH usefully controls emulsion break time and resin gel time.

The particle sizes of the droplets that are dispersed in the present emulsions are preferably correlated with permeability of the mass of particles into which the emulsion is to be flowed. When the size of such droplets is more than about ⅓ of the size of the pores within the mass of particles, the particles tend to bridge across and plug the openings. The opening-plugging droplets can only be pushed on by deforming them so that they undergo a viscous flow. In the present emulsions, relatively small particle sizes are readily obtainable. The epoxy emulsion TSX-679 (available from General Mills) contains about 50% by weight of polyepoxide emulsified in water and stabilized by a nonionic surfactant. Such emulsions may also contain small amounts such as ½% by weight of hydroxyethyl cellulose ether, or other water-soluble thickeners, to improve the emulsion stability. The mean particle size in such an emulsion is about 1 micron, with about 11.8% of the droplets being less than 0.5 micron. The attainment of small particle sizes can be aided by mixing devices such as colloid mills or other mixing devices that generate shearing energy. Further, a small particle size emulsion can be obtained by the use of an emulsion inversion technique in which the oil-phase liquid solution of the polyepoxide and amine is sheared by a device such as Cowles dissolver as water is gradually added, until the emulsion inverts to a wafer continuous system. The ability of the emulsions to penetrate fine pores can be further enhanced by diluting the droplets with a polar solvent in order to reduce their effective viscosity.

LABORATORY TESTS OF EPOXY EMULSIONS FOR USE IN SAND CONSOLIDATION

Typical laboratory test results are summarized in Table 1. In general, in these tests the material forming the masses of particles to be consolidated was a Clemtex No. 5 sand (80/120 mesh) packed in glass tubes 20.75 inches long and 1.44 inches in diameter. The sand packs had pore volumes of about 166 cubic centimeters and the pores were impregnated with 2% (by weight) sodium chloride brine. The packs were maintained at a temperature of 180° F and the emulsions injected into the pack were warmed up (during 30 minute intervals) to that temperature. The emulsions were injected in response to an injection pressure of about 10 pounds per square inch.

The first test shown in Table 1 resulted in consolidation of 14 inches of a 20.75 inch Clemtex No. 5 sand pack (6.0 darcy) by injecting 1.66

TABLE 1

TESTS OF VARIOUS FORMULATIONS OF A WATER-BASED EPOXY CONSOLIDATION SYSTEM

| Test No. | TSX-679* | Treatment Solution Composition, weight percent | | | H₂O | pH Initial/ Adjusted | P.V.'s of Treatment | Shut-In (hours) | Initial Perm., D | Final Perm. D | Ratio $k_i/k_f$ | Consolidated Length, in. |
| | | DMP-10 | DMP-30 | A-1100 | | | | | | | | |
| | | (Total: 100 weight percent) | | | | | | | | | | |
|---|---|---|---|---|---|---|---|---|---|---|---|---|
| 1 | 4.541 | 0.227 | 0.227 | 0.100 | 94.905 | Not Adjusted | 1.66 | 51 | 6.0 | 6 | 1.0 | 14 |
| 2 | 8.333 | — | 0.833 | — | 90.833 | 10.25/6.0 | 1.2 | 22 | 4.6 | 0 | 3 | |
| 3 | 8.333 | 0.833 | — | — | 90.833 | /6.0 | 2.0 | 21 | 5.5 | 3.2/2.7*** | 17 | |
| 4 | 8.333 | 0.833 | — | — | 90.833 | 9.2/(9.6)** | 2.0 | 22 | 6.1 | Inlet Screen Plugged | | 18 |

TABLE 1-continued

TESTS OF VARIOUS FORMULATIONS OF A WATER-BASED EPOXY CONSOLIDATION SYSTEM

| Test No. | Treatment Solution Composition, weight percent | | | | H₂O | pH Initial/ Adjusted | P.V.'s of Treatment | Shut-In (hours) | Initial Perm., D | Final Perm. D | Ratio $k_f/k_i$ | Consolidated Length, in. |
|---|---|---|---|---|---|---|---|---|---|---|---|---|
| | TSX-679* | DMP-10 | DMP-30 | A-1100 | | | | | | | | |
| | | (Total: 100 weight percent) | | | | | | | | | | |
| 5 | 8.333 | 0.833 | — | — | 90.833 | -/7.5 | — | 22 | 4.7 | 5.3 | 1.0 | 20 |
| 6 | 8.333 | 0.833 | — | — | 90.833 | -/7.0 | 22 | 7.2 | 6.6/6.5*** | 0.92 | 18.5 | |
| | Brazos Sand Mix No. 1, held in one-inch diameter Hassler, 18 cc pore volume | | | | | | | | | | | |
| 11 | 9.8***** | — | 0.78****** | — | 89.412 | — | 5.55 | 96 | 240 md | 38 md | 0.16 | 0.75 |

*Epoxy emulsion 50 weight percent EPON 828 (General Mills Chemical).
**Solution from feed vessel after run.
***Reverse flow.
****Mid-point of core sample.
***Emulsion "E-315" - 40 parts EPON 815, 10 parts MIBK, 50 parts water, 1 part Tween 20, 1 part Span 20, pH - 7.1.****Curing Agent "D".

pore volumes of a water-based epoxy system. The system contained about 95 weight percent water and 5 weight percent epoxy emulsion, amino curing-agent, and silane adhesion agent. The final permeability of sand was essentially equal to the original. A photoelectromicrogram shows that the resin becomes concentrated at the grain to grain contacts due to the strong wetting tendency of the droplets of resin-forming components. In this test, the pack was shut in 51 hours without overflushing before testing the final permeability. The compressive strength 3.25 inches from the front face was 525 psi and was 225 psi at 12.25 inches from the front face.

Test 2 used a higher epoxy emulsion concentration, 8.33 weight percent, and only the DMP-30 curing-agent. Here the pH was adjusted from 10.25 to 6.0 with HCl. The low pH caused such strong surface attraction that only 3 inches of the sand pack was invaded and consolidated. The sand was plugged, since the emulsion broke on the sand surface at the pack inlet.

The emulsion exemplified by test 2 is particularly useful for forming a plug within the first few inches from the face of a permeable formation. Such a plugging procedure is particularly useful in the process of the J. H. Thomeer U.S. Pat. No. 3,830,299. In that process the injectivity of an inhomogeneous interval of permeable formation is improved by forming such plugs in all permeable zones and then perforating through the plugged portions to provide openings that are sized and located to allow selected rates of flow at selected depths.

Test 3 used DMP-10 instead of DMP-30. The DMP-10 curing agent is a weaker wetting agent than DMP-30 so that even with the pH adjusted to 6.0 consolidation rather than plugging was obtained.

Test 4 was similar to Test 3 except the pH was not adjusted, but left at its initial value of 9.2. In this case, white epoxy emulsion was produced from the core (after about one pore volume was injected), due to the decreased surface interaction of the epoxy emulsion with the DMP-10 curing-agent at high pH. However, after a shut-in time of 22 hours at 180° F, 18 inches of the pack was consolidated and the compressive strength ranged from 500 psi near the inlet face to less than 50 psi beyond 13 inches into the pack. In this test the inlet screen (70 mesh) was plugged, although beyond about 0.3 inch into the pack the permeability was 90 percent or more of the original. With the screen removed, the first 2 inches of the core had a permeability of about 70 percent of original.

The pH of the effluent epoxy emulsion increased as successive samples were produced from the core. The pH of the first 100 cc of brine being displaced from the pack (by the injected emulsion) was 7.1. The next 100 cc (which contained epoxy emulsion droplets that had not been stripped out onto the sand) was pH 11.2, higher than the injected system. The final 32 cc measured pH 11.4.

This observation fits the following concepts. The surface active "cationic state" amine is stripped out on the sand thus removing acid ions, $H^+$, (probably in the form of the protonated tertiary-amine $R_3NH^+$) from the system resulting in the increased pH. The surface active nature of the amine curing agents is significant in causing the epoxy resin to coat the sand grains in a way that provide an effective consolidation.

An 8.33 weight percent TSX-679, 0.833 weight percent DMP-10 formulation was used in test No. 5. Here, the pH was adjusted to 7.5. Due to a leak from the emulsion reservoir the treatment leaked through the core during the first 30 minutes and then was overflushed with 2 weight percent NaCl brine. By this accidental treatment all 20 inches of the pack was consolidated with compressive strengths as high as 850 psi and essentially no permeability impairment.

The final test with Clemtex No. 5 sand (test No. 6) used this information with the pH adjusted to 7.0. Two pore volumes of treatment were injected and the pack was shut-in without overflushing for 22 hours at 180° F. Good consolidation results were obtained with 18.5 inches of the pack consolidated. The compressive strengths were in the range of 100 to 250 psi.

In test No. 11, of Table 1, consolidation of the first 0.75 inches of a 2.5 inch pack of a 240 md Brazos sand mixture was obtained. The 30 micron porous metal fritt at the face of the pack was bonded to the sand and the final permeability of the pack with this fritt in place was only 38 md. However, with the fritt removed the consolidated sand had a retained permeability of 123 md or 51 percent of original. The compressive strength of this core was 500 psi.

This consolidation near the face of a tight pack was obtained using an epoxy emulsion we made using EPON 815 cut back with 20 percent MIBK solvent (methylisobutylketone) to lower the viscosity of the epoxy to make a "softer" emulsion. The TSX-679 epoxy emulsion contains EPON 828 which is a much higher viscosity epoxy. Also Curing Agent D was used to obtain a latent temperature-triggered polymerization to help obtain injectivity of the emulsion.

Laboratory Tests of Coating Gravel

In one test an epoxy emulsion system was used to coat 13 pounds of 20–40 mesh gravel at room temperature with about 1.25 lbs of EPON 828. This coated gravel was then dispersed in water and also in gelled water at 10 lbs sand/gal carrier fluid and allowed to cure over night at 180° F. The gravel consolidated in the aqueous environment.

The test was conducted in accordance with the following directions:

1. Mix epoxy emulsion system consisting essentially of 87.5 volume percent TSX-679 epoxy emulsion, 9.3 volume percent DMP-10 amine curing-agent, 1.2 volume percent A-1100 silane adhesion agent, and 2.0 volume percent Conc. HCl to adjust the pH to 7.5.
2. Add 20–40 mesh gravel to emulsion as it is mixed by a Cowles dissolver.
3. Continue adding 20–40 gravel to emulsion/gravel slurry over a period of one hour and 20 minutes until sand concentration is 41 lbs/gal. Catalyzed epoxy emulsion breaks on sand surfaces.
4. Shut off mixer and allow sand to sit one hour 45 minutes. Sand is coated with catalyzed epoxy and somewhat sticky, but not sticking to itself.
5. Add coated sand to water carrier at concentration of 10 lbs/gal. Coated sand is dispersed in the water with mixer.
6. Coated sand in this carrier allowed to settle to bottom of container and then placed in oven over night at 180° F (first batch test).
7. A gelled water was made by dispersing 80 lbs/1000 gals of HEC in water with the Cowles mixer.
8. The catalyzed epoxy coated sand has now sat 2 hours and 30 minutes and is becoming "tacky."
9. Coated sand is dispersed with mixer in the HEC gelled water at a concentration of 10 lb/gal.
10. Coated sand in this carrier allowed to settle to bottom of container and then plaed in over night at 180° F (second batch test).

Over night these sand masses became consolidated. The permeability and compressive strength for samples of them are shown in Table 2.

A similar test of coating gravel with this epoxy emulsion system without the high shear mixing obtained with the Cowles dissolver has been carried out. In this test, sand was added to the emulsion until dry sand piled up in the vessel. Then additonal emulsion was added and then more sand, etc. In about 2 hours the white epoxy emulsion had broken on the sand to leave clear liquid around the sand with epoxy on the sand. The sand was at a concentration of about 41 lb/gal of emulsion during this coating process. This corresponds to a porosity of about 35 volume percent.

As before, the coated sand was dispersed in water (and in this case, 2 weight percent NaCl brine) and then allowed to settle to the bottom of the container. Over night at room temperature the sand was stuck together, although, at this temperature, the cure was not complete in 24 hours and the sand was not yet hard.

Table 2

PERMEABILITY AND COMPRESSIVE STRENGTH DATA FOR GRAVEL CONSOLIDATED BY THE EPOXY EMULSION GRAVEL COATING PROCESS

| Sample | Carrier | Cure Temperature | Compressive Strength | Permeability |
|---|---|---|---|---|
| | | °F | psi | |
| 1st Batch | Water | 70 | 2290 | 2.9 |
| 1st Batch | Water | 180 | 1272 | 4.5 |
| 2nd Batch | HEC Gel | 70 | 550 | 4.8 |

Table 2-continued

PERMEABILITY AND COMPRESSIVE STRENGTH DATA FOR GRAVEL CONSOLIDATED BY THE EPOXY EMULSION GRAVEL COATING PROCESS

| Sample | Carrier | Cure Temperature | Compressive Strength | Permeability |
|---|---|---|---|---|
| 2nd Batch | HEC Gel | 180 | 500 | 5.8 |

Laboratory Tests of Coating Gravel; Showing the Effect of pH

These tests were carried out in a prototype mixer similar to a 10-bbl ribbon blender of the type commonly used in mixing conventional gravel packing systems. The prototype mixer was constructed by horizontally mounting a 5-gallon bucket containing a central shaft on which mixing blades were attached. The blades are turned at low rpm (~ 30) with a variable speed drive. The time of mixing of the emulsion and the gravel was correlated to the emulsion break time (as observed in a test tube of the polymerizing emulsion). In these tests, mixing was continued until the resin had separated out of the emulsion leaving the clear aqueous phase above it in the test tube. At this time, the resin was still mobile and additional time was available to suspend the coated gravel in the aqueous carrier and inject the mass of gravel into a well.

The time for the emulsion to break and then for the separated resin to further polymerize into an immobile resin can be controlled by adjusting the pH of the epoxy/amine curing agent emulsion system. The pH is adjusted by adding concentrated HCl. The time for these various emulsions to break at 70° F increases with decreases of pH. The time required for the emulsion to break is the time for mixing the gravel and emulsion system in the coating process. In general, such tests show that emulsion stability increases with decreasing pH when a preferred amount of amine curing agent is used in the formulation. With excess amine, the polymerization can be so fast that the emulsion break time is not a strong function or pH or can even decrease with decreasing pH. The total time from the initial mixing of the resin-forming components for the resin to become polymerized to the extent that it is immobile approximates the time available for injecting the coated gravel into the well.

Table 3 shows compressive strength data and permeability taken during aging of consolidated gravel cores under 3 wt percent sodium chloride brine. There is some scatter in the data due to the difficulty in uniformly packing the coated gravel. However, none of the strengths were less than Table 3

AGING TESTS UNDER 3 WT PERCENT SODIUM CHLORIDE BRINE OF CONSOLIDATED 20-40 MESH GRAVEL CORES MADE WITH THE UNDILUTED EPOXY EMULSION SYSTEM (CONTAINING SILANE A-1100)

| | Aging Temperature | | |
|---|---|---|---|
| | 120° F | 150° F | 180° F |
| Day from Start of Aging* | (Permeability, Darcy) Compressive Strength, psi | | |
| 0 | (15D | — | —) |
| 0 | 750 | — | — |
| 1 | 600 | 1100 | 1500 |

Table 3-continued

AGING TESTS UNDER 3 WT PERCENT SODIUM CHLORIDE BRINE OF CONSOLIDATED 20–40 MESH GRAVEL CORES MADE WITH THE UNDILUTED EPOXY EMULSION SYSTEM (CONTAINING SILANE A-1100)

| Day from Start of Aging* | Aging Temperature | | |
|---|---|---|---|
| | 120° F | 150° F | 180° F |
| | (Permeability, Darcy) Compressive Strength, psi | | |
| 3 | 1000 | 1100 | 1100 |
| 4 | 1000 | 1000 | 1300 |
| 5 | 800 | 900 | 1050 |
| 6 | 800 | 1150 | 2000 |
| 7 | 950 | 2000 | 1250 |
| 10 | 800 | 1000 | 950 |
| 14 | 1000 | 800 | 1150 |
| 18 | 950 | 900 | 1000 |
| 22 | 1600 | 800 | 600 |
| 25 | 1000 | 1850 | 1000 |
| 25 | (5D | 4D | 6D) |
| 25 | 1200 | 3500 | 1100 |
| 32 | (5D | 9D | 15D) |
| 32 | 1100 | 1550 | 850 |
| Average | 968 | 1358 | 1142 |
| Overall Average | — | 1156 | — |

*Coated gravel cured at 120° F under 3 wt percent brine for 48 hours prior to coring and aging samples at various temperatures.

Table 4

AGING TESTS UNDER 3 WT PERCENT SODIUM CHLORIDE BRINE OF 20–40 MESH GRAVEL CONSOLIDATED WITH UNDILUTED AQUAPON EMULSION SYSTEM

No Silane Adhesion Agent in Formulation

| Day From Start of Aging* | Aging Temperature | | |
|---|---|---|---|
| | 120° F Compressive strength, psi | 150° F | 180° F |
| 3 | 550 | 550 | 800 |
| 11 | 600 | 750 | 800 |
| 17 | 900 | 900 | 840 |
| 26 | 550 | 660 | 550 |
| 31 | 750 | 750 | 500 |
| 37 | 760 | 680 | 780 |
| 51 | 500 | 780 | 760 |

*Coated gravel curved at 120° F under 3wt% sodium chloride brine for 48 hours prior to coating and aging samples at various temperatures.
Epoxy Loading: 10.25 lbs gravel/lbs epoxy.

Table 5

COMPRESSIVE STRENGTH AND PERMEABILITY DATA FOR 20–40 MESH ROUNDED OTTAWA GRAVEL COATED AND CONSOLIDATED IN AN AQUEOUS ENVIRONMENT WITH VARIOUS FORMULATIONS OF THE EPOXY EMULSION SYSTEM

| Test. No. | Composition Dilution | | | | pH | Cure Temp.* (° F) | Permeability (darcy) | Comp. Strength (psi) | Remarks |
|---|---|---|---|---|---|---|---|---|---|
| | TSX-679 | H₂O | DMP-10 | A-1100 | pH | | | | |
| | (vol. % w/o conc. HCl) | | | | | | | | |
| 62 | 89.25 | 0 | 9.5 | 1.25 | 7.56 | 150 | 25 | 800 | 15 minute wash cycle |
| 68 | 89.25 | 0 | 9.5 | 1.25 | 7.53 | 150 | 60 | 500 | Three 5 minute wash cycles |
| 68-A | 44.62 | 44.62 | 9.5 | 1.25 | 7.54 | 150 | 75 | 750 | Two 5 minute wash cycles |
| 70 | 62.47 | 31.23 | 4.99 | 1.31 | 10.25 | 150 | 55 | 200 | Three 5 minute wash cycles |
| 70-A | 62.47 | 31.23 | 4.99 | 1.31 | 7.49 | 150 | — | 0 | Three 5 minute wash cycles (no consolidation) |
| 70-B | 44.6 | 44.6 | 9.5 | 1.25 | 10.21 | 150 | 52 | 200 | Three 5 minute wash cycles |
| 70-C | 44.6 | 44.6 | 9.5 | 1.25 | 7.54 | 150 | 85 | 150 | Three 5 minute wash cycles |
| 71 | 59.5 | 29.75 | 9.5 | 1.25 | 10.20 | 150 | 55 | 250 | Three 5 minute wash cycles |
| 71-A | 59.5 | 29.75 | 9.5 | 1.25 | 7.52 | 150 | 68 | 250 | Three 5 minute wash cycles |
| 99 | 55.84 | 32.49 | 10.15 | 1.52 | 8.00 | 120 | 45 | 690 | 15 minute wash cycle |
| 100 | 55.84 | 32.49 | 10.15 | 1.52 | 8.25 | 120 | 130 | 160 | 15 minute wash cycle (void containing core) |
| 67 | permeability of the unconsolidated gravel | | | | | | 85 | | |

*48 hour cure time.

600 psi and they ranged up to 3500 psi with an average value of about 1160 psi. These data show that brine aging of these consolidated cores does not lead to rapid deterioration. The preparation of a 28-pound sample (from 28 pounds of gravel in 0.68 gallons of emulsion; 41-pound gravel per gallon emulsion) included a wash cycle in the horizontal mixer after the emulsion had broken. Such a wash tends to remove in excess resin and further spread the resin over the surfaces of the grains prior to placing them in the carrier. The wash water has a soapy water appearance indicating that surfactants in this emulsion system are being removed during the wash cycle which is thought to be desirable. In this case, the carrier was 3 wt percent NaCl brine. In these washes, the wash water had a soapy water appearance indicating that surfactants in the emulsion system were being removed during the wash cycle - which is thought to be desirable.

Table 4 shows data from similar tests in which the A-1100 was omitted from the formulation. The improved permeability may be due to a better wash cycle using a higher shear proptype mixer.

Laboratory Test of Coating Gravel; Without Precoating

This test employed a procedure that was substantially the same as that described under the subheading "Laboratory Tests of Coating Gravel" except that all of the ingredients for forming a suspension of resin-coated gravel particles were mixed together substantially simultaneously;

The carrier or suspending fluid contained:
78 per cent by volume of a hydroxyethylsalous thickened aqueous liquid containing 92 pounds of HEC and 2 pounds of ammonium sulfate per 1,000 gallons of water;
18 per cent by volume of TSX-679 epoxy emulsion;
3.35 per cent by volume DMP-10 amine carrying agent; and
0.65 per cent by volume concentrated hydrochloric acid solution containing about 38 per cent by weight HCl. Substantially as soon as the carrier liquid was formed it was mixed with about 13.3 pounds per gallon of Ottowa 20–40 mesh gravel. The resulting suspension was stirred for thirty (30) minutes at room temperature to simulate the pumping of such a suspension in the well. The suspension was then allowed to stand for about four days in an oven at 150° F.

The treatment provided a resin-consolidated mass of gravel having a compressive strength of about 200 psi and a permeability of about 105 darcy. The viscosity of the carrier liquid has undergone a reduction that reduced the magnitude of its viscosity from about 2,000 cp to a viscosity near that of water.

In compounding an oil-phase liquid solution to be used in gravel packing in accordance with this invention, the compositions of the polyepoxide and amine can be selected for relatively slow polymerization at ambient temperature while their relative concentrations are arranged to include a significant excess of amine. This provides an oil-phase liquid solution which can be dispersed in an aqueous liquid to obtain a relatively concentrated cationic emulsion that breaks quickly when contacted with solid particles such as sand grains and coats them with a solution of liquid reactants that remain liquid until they reach the well bottom and then react more rapidly to consolidate the grains with a solid resin. The time for the emulsion break for gravel coating and the time for the epoxy polymerization of the liquid resin coating on the gravel can be controlled by an adjustment of pH of the aqueous cationic emulsion containing the oil-phase liquid solution of the polyepoxide and amine.

Although the present sand consolidating treatments are advantageously adapted to be completed by injecting a single fluid, they can, where desired, be followed by an overflushing treatment. Suitable overflushing fluids comprise relatively dilute aqueous solutions of water soluble strong acid salts of strong bases, such as sodium chloride, etc.

Although the present consolidating treatments are adapted to form integral permeable structures, they can be used to substantially plug or reduce the permeability of a structure that was initially permeable. Such a plugging can be effected by injecting a series of slugs of the present emulsions, while allowing time for the resins to cure between the injections. Another possibility is to suspend in the emulsion relatively fine particles of silica flour sand, fiberglass, or mixtures thereof and then inject the resulting mass of epoxy coated fines into the well to plug a zone with a consolidated filter cake that is bonded to the formation face and/or to the walls of the pores near the face of the formation.

In gravel packing operations in which pack grains wetted with the present oil-phase liquid solutions of polyepoxide and tertiaryamine are suspended in a carrier liquid, although an oil-phase carrier liquid can be used, an aqueous carrier is preferred. Aqueous liquids thickened with water-soluble cellulose ethers, such as a hydroxyethyl cellulose ether, are particularly suitable. Where it is desirable that the carrier-liquid viscosity be self-breaking (rather than requiring a subsequent injection of a fluid, such as an acid enzyme, or the like, to react with the thickener and reduce the viscosity of the aqueous solution) the use of an oxidation-reduction type of breaker is generally preferred. Suitable breakers comprise ammonium persulfate, periodic acid, salts such as those described in U.S. Pat. No. 3,696,035, hydrazine or hydroxylamine compounds such as those described in U.S. Pat. No. 3,818,991, etc.

Laboratory Tests of Coating Gravel; With Precoating Without Washing

In the present invention the washing step of the gravel coating process can be omitted. In such a procedure the gravel and the coating emulsion are mixed until the emulsion has broken and then the gelled water carrier is flowed into the mixer to slurry the coated gravel. Such an omission of the wash step simplifies the process and may be useful on occasion. However, the excess resin (about 20 wt percent of the total resin) that would have been removed during a wash cycle may result in formation impairment in some situations. In other cases excess resin may serve a useful purpose by consolidating a formation sand behind the gravel pack. Overflushing the emplaced gravel pack with an aqueous liquid such as an NaCl brine would be one way of carrying out such as in situ consolidation step in a gravel packing process.

Table 6 shows strength and permeability properties of coated gravel packs in which the variations were employed in the washing procedures applied to the resin coated gravel.

Table 6

GRAVEL COATING WITH AND WITHOUT WASHING STEP
20–40 MESH GRAVEL STRENGTH AND PERMEABILITY

|  | Unwashed | 10 Min. Wash Step (1 gal H$_2$O/14 lb gravel) | Two-5 Min. Wash Steps (1 gal H$_2$O/28 lb Gravel) |
|---|---|---|---|
| Strength, psi (72 hr at 150° F) | 875 | 900 | 1000 |
| Permeability, Darcy | 133 | 160 | 159 |
| Final Epoxy Loading, lb gravel/lb epoxy | 16.4 | 19.7 | 19 |

Coating Emulsion
33 volume percent water
Two volume percent conc. HCl
55 volume percent TSX-679
10 volume percent DMP-10

Well Test of Resin-Coated Gravel Pack Installation

The well which was tested was a newly completed Gulf Coast well to be treated at a depth of about 5,000 feet adjacent to an unconsolidated reservoir sand. Prior to the treatment the sand which accumulated within the well during the perforation of the casing and cement was circulated out to a depth below the bottom performation. The well injectivity was tested with filtered brine and found to be such that about two barrels per minute could be injected at a surface pressure of 700 psi.

In conducting the treatment at the well site the following fluids were mixed in a horizontal auger-type blender:

13 bbls one weight percent KCl in fresh water (47.5 lbs KCl)
15 bbls 90 lb/1000 gal HEC gel (57.0 lbs HEC; hydroxyethyl cellulose)
one weight percent KCl (52.5 lbs KCl)

one lb/1000 gal ammonium persulfate (AP) gel breaker (0.63 lb AP)
about 70 gals of an emulsion containing
22 gals fresh water quent to the choke failure, a wire line run into the well showed no additional sand fill. The initial production tests with a new choke installed were as shown in Table 7.

Table 7

| Days After Treatment | Choke | PRODUCTION TESTS AFTER TREATMENT | | | | | |
|---|---|---|---|---|---|---|---|
| | | Flow Press. psi | Oil Rate B/D | Gas Rate MCFD | Water B/D | Sand | Test Duration |
| 1 | 10/64 | 640 | 300 | 72 | 0 | None or Trace | 4 Hours |
| 2 | 10/64 | 840 | 315 | 99 | 0 | None or Trace | 6 Hours |
| 3 | 10/64 | 1041 | 311 | 168 | 0 | None or Trace | 8 Hours |

1.4 gals 38 weight percent HCl
38.5 gals TSX-679 epoxy emulsion
7.0 gals DMP-10

The gravel was coated with a resin-forming solution and was suspended in an aqueous carrier liquid by a combination of the following steps:

1. Twenty-nine bags of 20–40 mesh rounded Ottawa gravel were added to the blender to make a thick 41 lb/gal slurry. The blender auger was operated to stir rapidly during this addition.
2. The thick gravel slurry was mixed until the sample of emulsion broke, i.e., started to separate into water and resin phases.
3. With auger continuing to stir, five barrels of fresh wash water were added to blender and stirring continued for ten minutes.
4. With auger continuing to stir, the wash water was siphoned off.
5. While still removing wash water, the HEC gel was started into an intake port of the blender.
6. After the coated gravel has been slurried into the gel, a portion of radio-actively tagged gravel was added.
7. The resulting slurry was pumped into well as a part of the following sequence of injected fluids:
   7.1 five barrels aqueous one weight percent KCl preflush solution
   7.2 five barrels aqueous HEC gel pad
   7.3 13 barrels slurry
   7.4 one barrel aqueous HEC gel afterflush
   7.5 9.25 barrels aqueous one weight percent KCl displacing fluid.

At screen-out, 2.15 barrels of the 7 lb/gal slurry had been injected through the 6 feet of perforations. The slurry remaining in the tubing was displaced into the casing. After the epoxy had cured (for 6 days), the consolidated gravel was drilled out and the well was brought on production. After some initial sand production, the well cleaned up and has since produced "sand free" or with "trace sand" with oil rates over 300 B/D and no water. Since sand fill was circulated out prior to the treatment and no fill was found after the initial oil production, these initial results show that the system is controlling sand in this well.

The initial productivity of the well indicates that the resin-consolidated gravel pack has given a highly unimpaired completion. During the initial production test, the well produced over 600 barrels of oil in less than 18 hours. Of that volume, about 100 barrels were produced at blowout conditions following a surface choke failure which apparently occurred from the choke splitting or by being cut out by produced sand. The standing tuing head pressure after shut in was 1500 psi. Subse- Some initial sand production such as occurred in this test is typical of other types of sand control treatments, such as EPOSAND (an in situ consolidation with an epoxy resin solution available from Shell Chemical Company), before reaching stabilized rates. There is no evidence that any resin-coated gravel has been produced from the well even at the high flow rates during blowout.

What is claimed is:

1. A well treating process for coating solid surfaces with a solution of epoxy resin-forming components that form a solid resin within a relatively remote and hot subterranean location in or around the borehole of the well, which process comprises:

compounding an oil-phase liquid solution of a polymerizable polyepoxide and a relatively water-soluble tertiary-amine that is capable of both catalyzing the polyepoxide polymerization and oil-wetting a solid surface;

dispersing said solution in an aqueous liquid to form an oil-in-water cationic emulsion that is capable of wetting solid surfaces with a resin-forming solution which will subsequently form a solid resin;

contacting the solid surfaces to be treated with said emulsion so that they are wetted with the resin-forming solution; and disposing the so-wetted solid surfaces within a relatively remote and hot subterranean location until the solid resin is formed.

2. The process of claim 1 in which the emulsion is injected into an unconsolidated reservoir formation in fluid-communication with the well.

3. The process of claim 2 in which the particle size and viscosity of the oil-phase components of the emulsion are correlated with the permeability of said reservoir to ensure their penetration into the reservoir formation.

4. The process of claim 1 in which:
the emulsion is first mixed with particles of sand or gravel until the particles are wetted with the resin-forming solution; and
the so-treated particles are mixed with a particle-suspending aqueous liquid and the resultant suspension is flowed into the well.

5. The process of claim 4 in which the composition and concentration of the components of the emulsion are adjusted so that at least a significant proportion of the emulsion breaks when contacted with said particles so that the particles are coated with the resin-forming solution while its components are liquid.

6. The process of claim 5 in which the solution-coated particles are subjected to a washing operation in which the coated particles are mixed with excess water or brine and then the excess water or brine is pumped off or removed from the particles prior to suspending them in the aqueous carrier.

7. The process of claim 4 in which the pH of the emulsion is adjusted to cause it to break relatively soon after it is mixed with the sand or gravel particles.

8. The process of claim 7 in which the composition of the resin-forming solution is adjusted so that the rate of polymerization is relatively slow at the ambient surface temperature but is relatively rapid at the temperature of the subterranean location.

9. The process of claim 1 in which:
the resin-forming solution is dispersed in the emulsion in relatively large droplets; and
the emulsion is injected into a permeable subterranean material to be plugged.

10. The process of claim 9 in which:
finely-divided solids are suspended in the emulsion; and
the liquid phase of the suspension is injected into the permeable material while at least some of the suspended solids are screened out to subsequently become a relatively impermeable consolidated filter cake on the face of that material.

11. The process of claim 1 in which solid particles are suspended in a mixture of said oil-phase liquid solution and aqueous liquid and the resulting suspension is flowed into the well.

12. The process of claim 11 in which said solid particles comprise grains of sand or gravel and said mixture of oil-phase liquid solution and aqueous liquid are mixed with a water thickening agent.

13. The process of claim 12 in which said thickening agent comprises a water-soluble cellulose ether mixed with an oxidation-reduction type of viscosity breaker.

14. The process of claim 1 in which
the emulsion is first mixed with particles of sand or gravel and agitated until the particles are wetted with the resin-forming solution;
the resulting mixture of coated particles and emulsion forming components is mixed with a relatively viscous aqueous liquid to form an aqueous liquid suspension of the coated particles;
said suspension is pumped into the well ahead of an aqueous liquid to form a gravel pack within the well; and
said aqueous liquid is pumped at least substantially through that gravel pack to displace into the surrounding earth formations at least some of the emulsion-forming components that did not dissolve in the resin-forming solution that coats the gravel particles.

15. The process for coating solid surfaces with a solution of epoxy resin-forming components which become converted to a solid resin while those surfaces are disposed within a relatively remote and relatively hot subterranean location which process comprises:
compounding an oil-phase liquid solution of a polymerizable polyepoxide and a relatively water-soluble tertiary amine that is capable of both catalyzing the polyepoxide polymerization and oil-wetting a solid surface;
dispersing said solution in an aqueous liquid to form an oil-in-water cationic emulsion that is capable of wetting solid surfaces with a resin-forming solution that will subsequently form a solid resin;
contacting the solid surfaces to be treated with said emulsion so that they are wetted with the resin-forming solution; and
disposing the so-wetted solid surfaces within said relatively remote and relatively hot subterranean until the solid resin is formed.

16. The process of claim 15 in which the solid surfaces are contacted by the emulsion by injecting the emulsion into an unconsolidated reservoir formation.

17. The process of claim 15 in which
the emulsion is first mixed with particles of sand or gravel until the particles are wetted with the resin-forming solution; and
the so-treated particles are so mixed with a particle suspending aqueous liquid and the resultant suspension is flowed into the borehole of a well.

18. The process of claim 15 in which the composition of the resin-forming solution is adjusted so that the rate of polymerization is relatively slow at ambient temperature but is relatively rapid at the temperature of said relatively remote location.

19. The process of claim 15 in which
finely divided solids are suspended in the emulsion;
the liquid phase of the suspension is injected into a permeable material while at least some of the suspended solids are screened out to subsequently become a relatively impermeable consolidated filtered cake disposed on the face of and within a near face portion of that material.

20. The process of claim 15 in which solid particles are suspended in said emulsion and the resultant suspension is flowed into said relatively remote location.

21. The process of claim 20 in which said solid particles comprise grains of sand or gravel and said emulsion contains a self-breaking water-thickening agent comprising a cellulose ether mixed with an oxidation-reduction type of viscosity breaker.

* * * * *